US010502951B2

(12) United States Patent
Sitter, Jr. et al.

(10) Patent No.: US 10,502,951 B2
(45) Date of Patent: Dec. 10, 2019

(54) HIGH-PERFORMANCE BEAM DIRECTOR FOR HIGH-POWER LASER SYSTEMS OR OTHER SYSTEMS

(71) Applicant: Raytheon Company, Waltham, MA (US)

(72) Inventors: David N. Sitter, Jr., Torrance, CA (US); Joseph Marron, Manhattan Beach, CA (US); Maurice J. Halmos, Encino, CA (US); Joseph J. Ichkhan, Redondo Beach, CA (US); Justin S. Grayer, Arlington Heights, IL (US); Gamze Erten, Agoura Hills, CA (US)

(73) Assignee: Raytheon Company, Waltham, MA (US)

( * ) Notice: Subject to any disclaimer, the term of this patent is extended or adjusted under 35 U.S.C. 154(b) by 856 days.

(21) Appl. No.: 15/176,009

(22) Filed: Jun. 7, 2016

(65) Prior Publication Data

US 2018/0267299 A1   Sep. 20, 2018

(51) Int. Cl.
*G02B 27/00* (2006.01)
*F41H 13/00* (2006.01)
(Continued)

(52) U.S. Cl.
CPC ....... *G02B 27/0068* (2013.01); *F41H 13/005* (2013.01); *G01J 1/0238* (2013.01);
(Continued)

(58) Field of Classification Search
CPC ..... F41H 13/005; G01J 1/0238; G01J 1/0242; G01J 1/02; G01S 17/66; G01S 7/4814;
(Continued)

(56) References Cited

U.S. PATENT DOCUMENTS 5,780,838 A   7/1998   Livingston et al.
5,780,839 A   7/1998   Livingston
(Continued)

FOREIGN PATENT DOCUMENTS

CN   104034416 A   9/2014
EP   0899586 A2   3/1999

OTHER PUBLICATIONS

Joseph Marron, et al., "System for Coherent Imaging in Dynamic Engagements," U.S. Appl. No. 14/988,476, filed Jan. 5, 2016, 25 pages.

(Continued)

*Primary Examiner* — William R Alexander
*Assistant Examiner* — Balram T Parbadia

(57) ABSTRACT

An apparatus includes a wavefront sensor configured to receive coherent flood illumination that is reflected from a remote object and to estimate wavefront errors associated with the coherent flood illumination. The apparatus also includes a beam director optically coupled to the wavefront sensor and having a telescope and an auto-alignment system. The auto-alignment system is configured to adjust at least one first optical device in order to alter a line-of-sight of the wavefront sensor. The wavefront errors estimated by the wavefront sensor include a wavefront error resulting from the adjustment of the at least one first optical device. The beam director could further include at least one second optical device configured to correct for the wavefront errors. The at least one second optical device could include at least one deformable mirror.

28 Claims, 8 Drawing Sheets

(51) Int. Cl.

| | | |
|---|---|---|
| *G01S 17/66* | (2006.01) | |
| *G01S 7/481* | (2006.01) | |
| *G01S 7/497* | (2006.01) | |
| *G02B 26/06* | (2006.01) | |
| *G06T 7/521* | (2017.01) | |
| *G01J 1/02* | (2006.01) | |
| *G02B 17/00* | (2006.01) | |
| *G02B 17/06* | (2006.01) | |

(52) U.S. Cl.
CPC .......... *G01J 1/0242* (2013.01); *G01S 7/4814* (2013.01); *G01S 7/497* (2013.01); *G01S 17/66* (2013.01); *G02B 17/008* (2013.01); *G02B 17/0663* (2013.01); *G02B 26/06* (2013.01); *G06T 7/521* (2017.01); *G06T 2207/10032* (2013.01); *G06T 2207/10048* (2013.01); *G06T 2207/10141* (2013.01)

(58) Field of Classification Search
CPC ... G01S 7/497; G02B 17/008; G02B 17/0663; G02B 26/06; G02B 27/0068; G02B 17/00; G02B 17/06; G02B 27/00; G06T 7/521; G06T 2207/10032; G06T 2207/10048; G06T 2207/10141
See application file for complete search history.

(56) References Cited

U.S. PATENT DOCUMENTS

| | | | |
|---|---|---|---|
| 5,900,620 A | | 5/1999 | Livingston |
| 6,115,123 A | * | 9/2000 | Stappaerts .............. G01S 7/486 250/201.9 |
| 6,343,766 B1 | | 2/2002 | Livingston |
| 7,342,651 B1 | * | 3/2008 | Woolfson ................ G01S 7/484 356/28 |
| 7,405,834 B1 | | 7/2008 | Marron et al. |
| 8,068,235 B1 | | 11/2011 | Marron et al. |
| 8,362,410 B2 | | 1/2013 | King et al. |
| 8,415,600 B2 | | 4/2013 | Hutchin |
| 8,748,857 B2 | | 6/2014 | King et al. |
| 8,755,036 B2 | | 6/2014 | Hutchin |
| 8,972,163 B2 | | 3/2015 | Green et al. |
| 2012/0018614 A1 | * | 1/2012 | King ..................... G02B 26/06 250/201.9 |
| 2012/0298839 A1 | * | 11/2012 | King ...................... F41A 23/20 250/203.1 |
| 2014/0160458 A1 | * | 6/2014 | Halmos ................ G01S 17/003 356/4.01 |

OTHER PUBLICATIONS

Joseph Marron, et al., "Laser Beam Projection System with Dynamic Phase Compensation," U.S. Appl. No. 15/072,214, filed Mar. 16, 2016, 33 pages
A.E. Siegman, "The Antenna Properties of Optical Heterodyne Receivers," Proceedings of the IEEE, vol. 54, No. 10, Oct. 1966, pp. 1350-1356, publisher IEEE, Piscataway, NJ.
International Search Report and Written Opinion for PCT/US2017/019350, European Patent Office, dated May 19, 2017, 14 pages.
Donald J. Link and Richard St. John, "Simulation and modeling of high energy laser systems," Laser Technologies for Defense and Security, Proceedings of SPIE, vol. 5414 (SPIE, Bellingham, WA), 2004, pp. 26-40.
Geoffrey E. Forden, "The Airborne Laser," IEEE Spectrum, Sep. 1997, pp. 40-49, XP-0000740482.

* cited by examiner

HIGH-PERFORMANCE BEAM DIRECTOR FOR HIGH-POWER LASER SYSTEMS OR OTHER SYSTEMS

TECHNICAL FIELD

This disclosure generally relates to imaging systems and other systems using high-power lasers or requiring a high degree of line-of-sight control or wavefront error correction. More specifically, this disclosure relates to a high-performance beam director for high-power laser systems and other systems.

BACKGROUND

High-power laser systems are being developed for a number of military and commercial applications. One example use of high-power laser systems involves capturing images of remote objects, such as drones or other aircraft. Another example use of high-power laser systems involves focusing high-power lasers to achieve high energy accumulation on remote objects to produce certain effects. In these and other types of systems, beam directors are often needed to track moving objects and to direct or focus laser beams onto the moving objects. This typically occurs in the presence of atmospheric disturbances, aero-optic effects, and other disturbances.

Conventional beam directors often use "on-axis" telescope designs in which a secondary mirror is placed physically in front of a primary mirror. Such telescopes are referred to as "obscured" telescopes since the central portion of the primary mirror is obscured by the secondary mirror. While suitable for use at low laser powers, on-axis telescope designs typically require accommodations for use at high laser powers to avoid illuminating the secondary mirror and its associated support structures to high-power laser beams, which can damage or degrade the performance of those components. Moreover, the obscuration associated with on-axis telescopes reduces the effectiveness of focused beams on remote objects.

Conventional laser imaging systems and high energy laser (HEL) focusing may also require the use of a "beacon" laser to be focused to a small spot on the object and a sensor to estimate the wavefront error of the optical path from the object to the sensor. However, this approach is complicated by the need for a separate beacon laser, as well as by blurring of the outgoing beacon laser beam by atmospheric disturbances, aero-optic effects, and other disturbances.

SUMMARY

This disclosure provides a high-performance beam director for high-power laser systems and other systems.

In a first embodiment, an apparatus includes a wavefront sensor configured to receive coherent flood illumination that is reflected from a remote object and to estimate wavefront errors associated with the coherent flood illumination. The apparatus also includes a beam director optically coupled to the wavefront sensor and having a telescope and an auto-alignment system. The auto-alignment system is configured to adjust at least one first optical device in order to alter a line-of-sight of the wavefront sensor. The wavefront errors estimated by the wavefront sensor include a wavefront error resulting from the adjustment of the at least one first optical device.

In a second embodiment, a system includes at least one illumination source configured to generate coherent flood illumination. The system also includes a wavefront sensor configured to receive the coherent flood illumination that is reflected from a remote object and to estimate wavefront errors associated with the coherent flood illumination. The system further includes a beam director optically coupled to the wavefront sensor and having a telescope and an auto-alignment system. The auto-alignment system is configured to adjust at least one first optical device in order to alter a line-of-sight of the wavefront sensor. The wavefront errors estimated by the wavefront sensor include a wavefront error resulting from the adjustment of the at least one first optical device.

In a particular embodiment, the system further includes a high-energy laser (HEL) source configured to generate HEL illumination, and the telescope includes a focusing mechanism. The wavefront errors estimated by the wavefront sensor include a wavefront error resulting from the focus mechanism.

In a third embodiment, a method includes receiving coherent flood illumination that is reflected from a remote object at a wavefront sensor. The method also includes estimating wavefront errors associated with the coherent flood illumination using the wavefront sensor. The method further includes adjusting a line-of-sight of the wavefront sensor using a beam director having a telescope and an auto-alignment system. The auto-alignment system adjusts at least one first optical device in order to alter the line-of-sight of the wavefront sensor. The wavefront errors estimated by the wavefront sensor include a wavefront error resulting from the adjustment of the at least one first optical device.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Coherent imaging systems rely on interference between a local oscillator (LO) beam and a reflected or return beam from a coherently illuminated object. Coherent imaging provides great value for interrogating distant objects. Specific elements of this value include improved performance with low light levels, three-dimensional (3D) imaging, correction of optical aberrations, and evaluation of intra-object motion. For example, coherent imaging generally involves photon-limited detection, which allows operation with lower illumination power than direct detection methods. In addition, 3D images may be obtained by combining coherent images at different wavelengths, and optical aberrations (such as wavefront errors) may be determined and corrected with coherent imaging.

Coherent signatures, however, are often very dynamic, such as due to movement of the object being illuminated or movement of the laser system performing the illuminating. Beam directors are often needed to track a moving object and to direct or focus a laser beam onto the moving object. While various approaches have been developed for providing these types of beam directors, those approaches can suffer from a number of problems.

Figure 1:
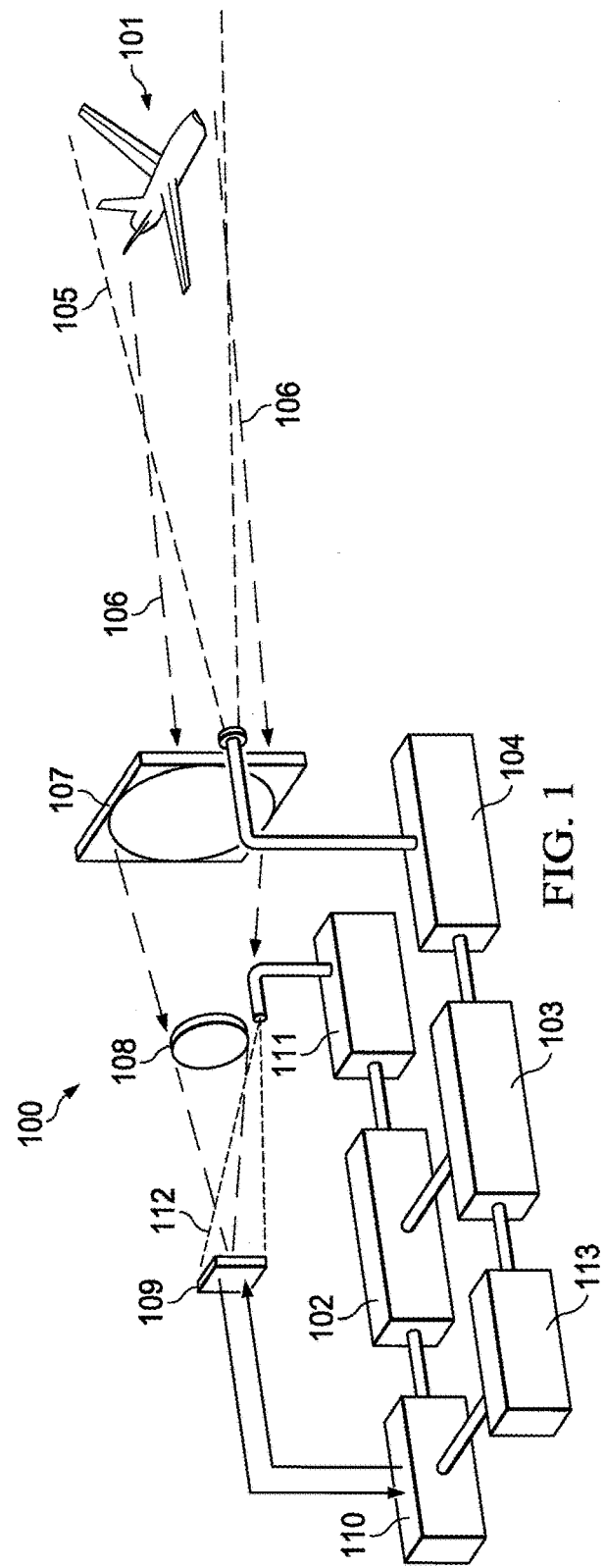
FIG. 1 illustrates an example coherent imaging system in accordance with this disclosure.

FIG. 1 illustrates an example coherent imaging system 100 in accordance with this disclosure. Those skilled in the art will recognize that, for simplicity and clarity, some features and components are not explicitly shown, including those illustrated in connection with later figures. For example, the entire optical system (including all mirrors, lenses, beam splitters, beam combiners, transmitters/receivers, apertures, electromechanical shutters, etc. and their associated light paths) is not illustrated in FIG. 1. Such features, including those illustrated in later figures, will be understood to be equally applicable to the coherent imaging system 100 of FIG. 1.

The coherent imaging system 100 is used here to image a target object 101 and does not include the target object 101 itself. A master oscillator 102 produces a frequency signal, which passes through a modulator 103 and a power amplifier 104 in order to generate coherent flood illumination 105 directed toward the object 101 to be imaged. Reflected or return illumination 106 reflected off the object 101 is received through an exit pupil 107 and focused through an imaging pupil 108 onto a short-wave infrared (SWIR) focal plane array (FPA) 109. The SWIR FPA 109 operates under the control of at least one computer or processing device 110, which is coupled to the master oscillator 102. Also coupled to the master oscillator 102 is a local oscillator (LO) 111, which drives an illumination source (not explicitly shown) directing illumination 112 onto the SWIR FPA 109.

In the system 100 of FIG. 1, the target object 101 is flood illuminated with the coherent flood illumination 105 at a frequency derived from the master oscillator 102. The reflected or return illumination 106 interferes with the illumination 112 based on the frequency of the LO 111, and this interference may be determined based on total light detected using the FPA 109. This detection method may be referred to as spatial heterodyne or digital holography (DH). Such interference imaging enables photon-noise limited detection and phase processing that also allows 3D imaging, aberration determination/correction, and vibration imaging.

The system 100 in FIG. 1 may further include a ranging sensor 113. The ranging sensor 113 can be used to estimate the initial distance or range to the target object 101. As described in more detail below, the estimated range to the target object 101 can be used to help initially focus a telescope that directs illumination to and receives illumination from the target object 101. The ranging sensor 113 includes any suitable structure for identifying a target range, such as a RADAR or LADAR.

Figure 2:
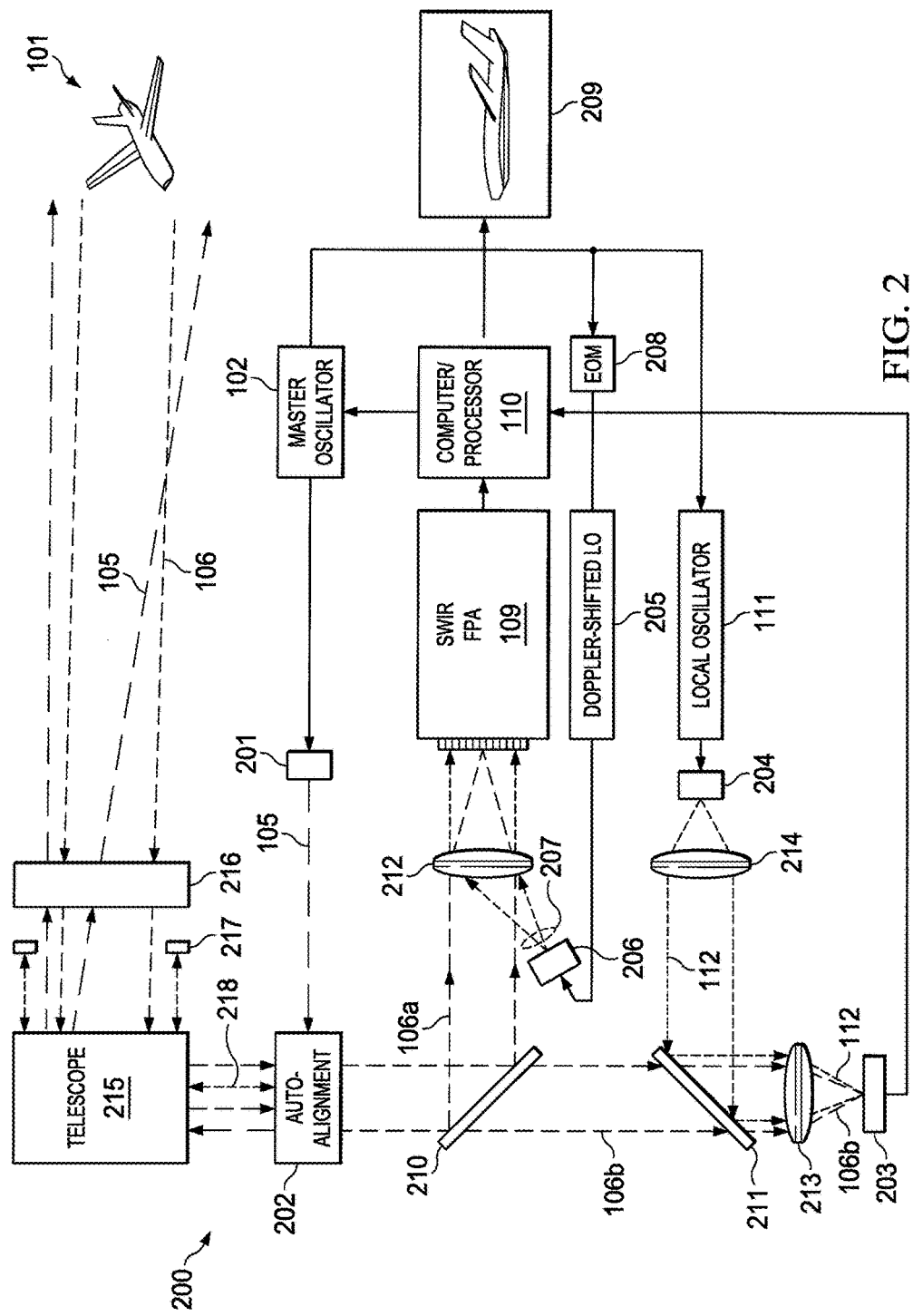
FIG. 2 illustrates another example coherent imaging system in accordance with this disclosure.
Figure 3:
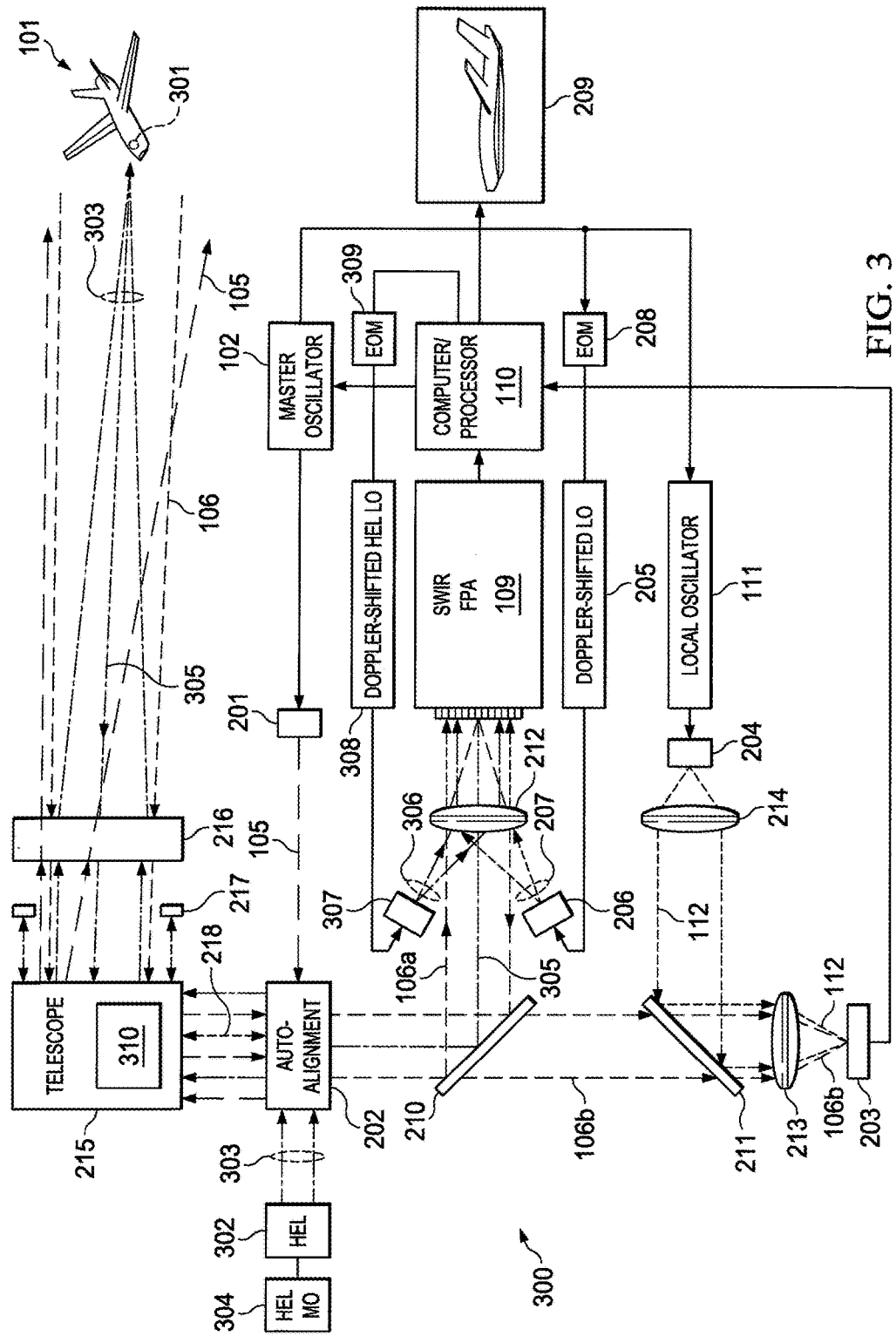
FIG. 3 illustrates an example coherent imaging system combined with a high-energy laser (HEL) system in accordance with this disclosure.

FIG. 2 illustrates another example coherent imaging system in accordance with this disclosure, and FIG. 3 illustrates an example coherent imaging system combined with a high-energy laser (HEL) system in accordance with this disclosure. For simplicity and clarity, some components of FIG. 1 and/or later figures are not shown in FIGS. 2 and 3, while additional components not illustrated in FIG. 1 are shown in FIGS. 2 and 3. It will be understood that all features illustrated in the figures may be employed in any of the embodiments described here. Omission of a feature or component from a particular figure is for purposes of simplicity and clarity and not meant to imply that the feature or component cannot be employed in the embodiments described in connection with that figure.

As shown in FIG. 2, a coherent imaging system 200 includes an optical power amplifier 201 that is driven by the master oscillator 102 and generates the coherent flood illumination 105, which reflects off the object 101 and is received as the reflected or return illumination 106. In the embodiment shown in FIG. 2, the coherent light from the optical power amplifier 201 passes through an auto-alignment system 202, a telescope 215, and an output window 216. Examples of the auto-alignment system 202 are described in more detail below. The reflected or return illumination 106 similarly passes through the window 216, the telescope 215, and the auto-alignment system 202.

A portion 106a of the reflected or return illumination 106 is focused on the SWIR FPA 109. Another portion 106b of the reflected or return illumination 106 is focused on a Doppler sensor 203. The Doppler sensor 203 has a single pixel or multiple pixels that measure Doppler frequency of the illumination 106 relative to the LO illumination 112. The LO illumination 112 is carried along a light conduit (such as a fiber) to an exit point 204. The sampling rate for the Doppler sensor 203 can be greater than the greatest (longitudinal) velocity for the target object 101 divided by the wavelength used for the flood illumination 105 (or other illumination source(s)).

The output of the Doppler sensor 203 is received by the computer or processing device 110, which determines a Doppler shift (or offset) of the reflected or return illumination 106 relative to the flood illumination 105. That Doppler shift is representative of the longitudinal velocity (or, stated differently, the longitudinal component of the total velocity) of the object 101 relative to the coherent imaging system 200. The Doppler shift can be measured and updated on a regular basis to account for longitudinal acceleration by the object 101 or the imaging system. The Doppler shift is employed by a Doppler-shifted LO 205, which generates a Doppler-shifted version of the output frequency from the LO 111. The Doppler-shifted output from the LO 205 is carried along a light conduit (such as a fiber) to an exit point 206, which provides the output as Doppler-shifted LO illumination 207.

A value based on a measurement (such as an inverse) of the Doppler shift may be applied to the frequency signal from the master oscillator 102 by an electro-optic modulator (EOM) 208. The output of the EOM 208 is received by the Doppler-shifted LO 205, which produces the Doppler-shifted LO illumination 207. For a pulsed system, the Doppler sensor 203 can also measure the target range so that the SWIR FPA 109 may be triggered when a return pulse from the object 101 is present.

The SWIR FPA 109 receives the Doppler-shifted LO illumination 207 superimposed with the portion 106a of the reflected or return illumination 106 to offset Doppler effects on the imaging. As a result, the interference pattern can be recorded with a low bandwidth focal plane array, such as an FPA operating with a 0.1 µs to 1 µs global shutter.

The computer or processing device 110 processes various data to generate one or more images of the target object 101. The computer or processing device 110 can use the images in any suitable manner, such as by presenting the images to one or more operators or other users on at least one display device 209.

Various optical devices are used in the coherent imaging system 200 to support the transport or modification of optical signals. For example, a beam splitter 210 can be used to separate the reflected or return illumination 106 into the different portions 106a-106b. A beam combiner 211, which may be polarized to pass the portion 106b of the reflected or return illumination 106, effectively superimposes the portion 106b of the reflected or return illumination 106 and the LO illumination 112. Lenses 212-213 are used to focus illumination onto the FPA 109 and Doppler sensor 203, respectively, while a lens 214 is used to expand the illumination 112.

The telescope 215 is used to direct the flood illumination 105 towards the target 101 and receive the reflected or return illumination 106 from the target 101. The telescope 215 denotes any suitable telescope. In some embodiments, the telescope 215 denotes an off-axis telescope, although other types of telescopes could be used. The window 216 allows passage of various illumination used by the imaging system. The window 216 includes any suitable structure that is substantially transparent to at least the wavelengths used by the imaging system.

The imaging system further includes a mirror 217, which is used to reflect auto-alignment illumination 218 from the auto-alignment system 202 back to the auto-alignment system 202. As described in more detail below, the auto-alignment system 202 uses the auto-alignment illumination 218 to provide an indication of internal light-of-sight errors or other errors within the imaging system, which could be caused by factors such as shock, vibrations, or thermal variations in the imaging system. The auto-alignment system 202 can then adjust one or more components of the auto-alignment system 202 to compensate for these errors. In some embodiments, the mirror 217 denotes an annular mirror that is substantially normal to the telescope's optical axis and that has a central opening through which the coherent flood illumination 105 and the reflected or return illumination 106 can pass.

As discussed above, coherent imaging methods have great value for obtaining image-based information from distant objects, including lower illumination power and determination of and correction for optical aberrations (such as wavefront errors). In addition, wavelength selectivity allows for simultaneous imaging of multiple bands. Accordingly, digital holography may be employed to simultaneously image and observe a high-energy laser (HEL) beam spot on a distant non-cooperative target.

As shown in FIG. 3, a coherent imaging system 300 is similar to the embodiment of FIG. 2 but is extended to support the use of a projected laser spot (an HEL hitspot 301) on the target object 101. In this example, an HEL 302 produces high-power laser illumination (HEL illumination) 303 for projecting the HEL hitspot 301 on the object 101. The HEL 302 may operate based on a signal from an HEL master oscillator 304, which is separate from the master oscillator 102. The HEL illumination 303 is processed within the auto-alignment system 202 and is directed toward the object 101 via the telescope 215 and the window 216 to form the HEL hitspot 301 on the object 101.

An HEL beam return 305 reflected off the object 101 follows a similar path as the reflected or return illumination 106 and impinges upon the SWIR FPA 109. Also, HEL LO-modulated illumination 306 is carried along a light conduit (such as a fiber) to an exit point 307 and is based on an output of a Doppler-shifted HEL LO 308 is superimposed on the SWIR FPA 109 along with the HEL beam return 305. The Doppler-shifted HEL LO 308 may receive a signal from an EOM 309 based on an output of the Doppler sensor 203 and produce an output based on the EOM signal.

With this configuration, the HEL LO illumination 306 is spatially, angularly, and spectrally offset from the Doppler-shifted LO illumination 207. The HEL LO illumination 306 is emitted onto the SWIR FPA 109, together with the reflected or return illumination 106, the HEL beam return 305, and the LO illumination 207. The gating or global shutter speed for gating the SWIR FPA 109 may be set based upon the pulse timing for the reflected or return illumination 106.

Because the HEL illumination 303 is typically continuous wave (CW) rather than pulsed, the system 300 offers flexibility in modifying the detector integration time for the HEL imaging. There may also be orders of magnitude difference in the power levels of the HEL beam return 305 and the reflected or return illumination 106. To prevent saturation of the SWIR FPA 109 by the HEL beam return 305, various techniques (including spectral and polarization attenuation) may be employed, or the detector integration time may be adaptively decreased when the HEL beam return 305 is present. The combined illumination received at the SWIR FPA 109 is processed by the computer or processing device 110 to generate an image of the object 101 and an image of the projected laser spot on the object 101 (if in fact the HEL illumination 303 is reflected off the object 101). The superposition of the two images can be shown on the display device 209.

The telescope 215 in FIG. 3 includes a focusing mechanism 310. As described in more detail below, the focusing mechanism 310 can be used to focus the HEL illumination 303 onto the target 101 in order to create the HEL hitspot 301. Moreover, the auto-alignment system 202 operates to help compensate for line-of-sight shifts and aberrations typically created when a telescope changes its focus. Any suitable focusing mechanism 310 can be used in a telescope. In some embodiments, the mirror 217 again denotes an annular mirror that is substantially normal to the telescope's optical axis and that has a central opening through which the coherent flood illumination 105, the reflected or return illumination 106, and the HEL illumination 303 can pass.

As described in more detail below, the imaging system supports an agile beam director with active focus and light-of-sight (LOS) control, co-boresighted SWIR imagery, and adaptive optical wavefront error (WFE) correction.

The beam director operates in conjunction with a digital holographic sensor (such as the ones used in FIGS. 2 and 3) or other wavefront sensor to enable an unobscured off-axis telescope to be dynamically focused onto moving target objects. The adaptive optical WFE correction corrects for both internal optical aberrations and external wavefront errors caused by atmospheric disturbances and aero-optical effects. The beam director architecture employs digital holographic or other wavefront sensing to provide co-boresighted enhanced imagery and estimates of WFE correction, and a secondary mirror of an off-axis telescope can be moved to adjust the focus, nominally correct the LOS error shift, and minimize induced aberrations. If a deformable primary mirror is used, the conic constant of the primary mirror can be changed to correct for induced aberrations. If a deformable mirror is used elsewhere (not as the primary mirror), the deformable mirror can be used to correct for induced aberrations. An auto-alignment scheme is used to maintain pointing accuracy as the telescope is focused. This approach can operate effectively without requiring a separate "beacon" laser (only the illuminating laser or lasers are needed), which can significantly reduce the potential size, weight, cost, and power of the system.

Although FIGS. 1 through 3 illustrate examples of coherent imaging systems (with and without HEL capabilities), various changes may be made to FIGS. 1 through 3. For example, various components in FIGS. 1 through 3 could be combined, further subdivided, omitted, or rearranged and additional components could be added according to particular needs. As a particular example, the computer or processing device 110 could be subdivided into a number of controllers and processing devices for performing different functions. Also, any of the components shown in one or more of these figures could be used in others of these figures. In addition, while FIGS. 1 through 3 illustrate example environments in which a beam director could be used, beam directors could be used in any other suitable system.

As noted above, on-axis telescopes are often used in beam directors. Unobscured off-axis telescope designs may be preferable over on-axis telescopes since they could provide the highest irradiance on a target object 101, but dynamically focusing such telescopes using conventional approaches can be difficult. For example, moving the secondary mirror of an unobscured off-axis telescope to focus outgoing HEL illumination typically introduces line-of-sight shifts and aberrations.

The approaches described in this patent document use a digital holographic sensor or other wavefront sensor to provide an actively-illuminated SWIR image of a target object, a target range, and an estimate of two-dimensional (2D) WFE that is used for active WFE compensation. A pulsed SWIR illuminator laser is generally used, but tight focus on the target object 101 is not required. The active auto-alignment system 202 maintains the LOS as the focus of the telescope is varied and may help to correct for WFE and other errors.

FIGS. 4 through 10 illustrate an example auto-alignment system 202 for a coherent imaging system or other system and related details in accordance with this disclosure. For ease of explanation, the auto-alignment system 202 may be described as being used in the coherent imaging systems of FIGS. 1 through 3. However, the auto-alignment system 202 could be used in any other suitable system to provide high-performance line-of-sight control or other control.

Figure 4:
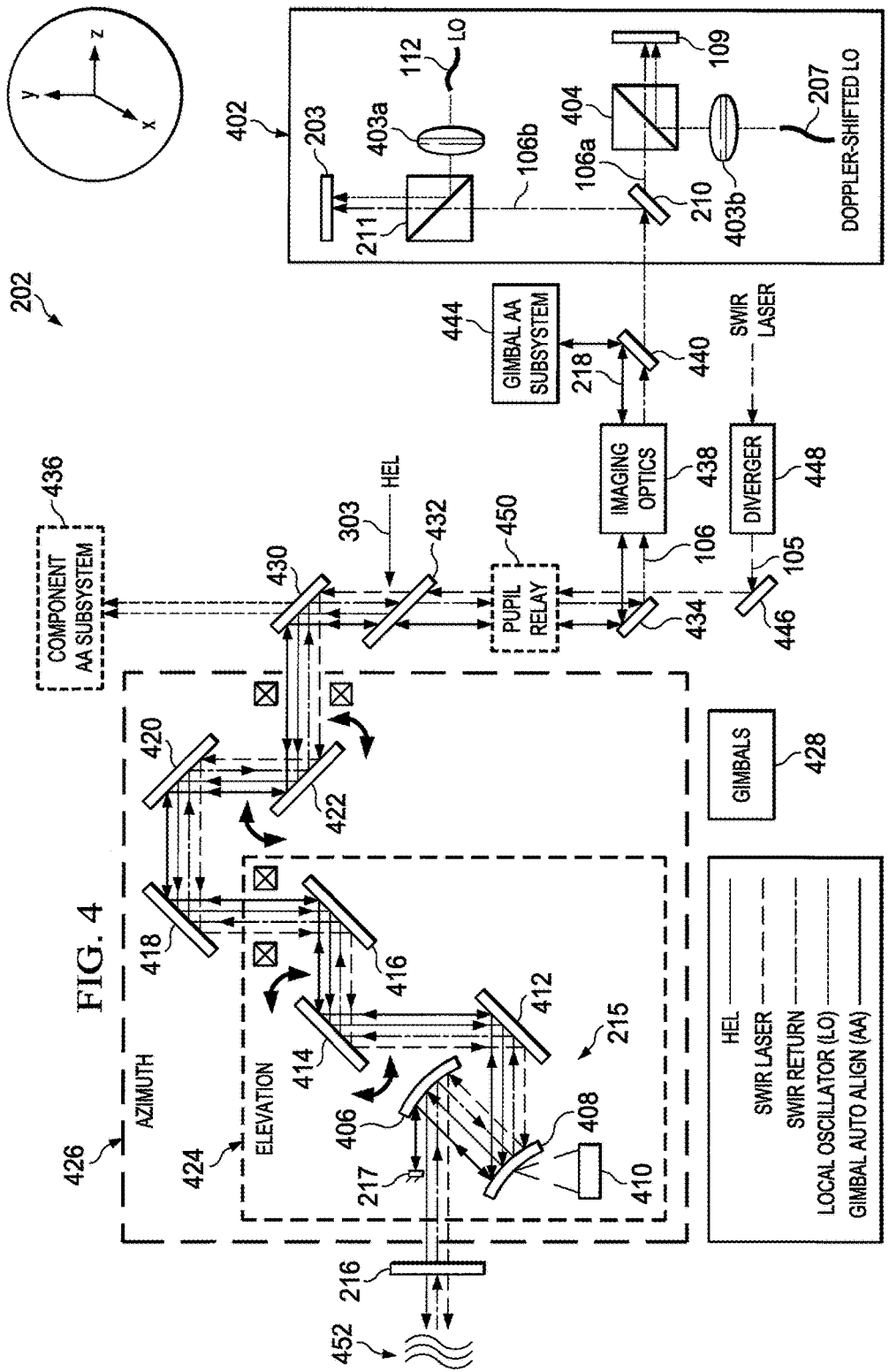
FIGS. 4 through 10 illustrate an example auto-alignment system for a coherent imaging system or other system and related details in accordance with this disclosure.

As shown in FIG. 4, the auto-alignment system 202 is used in conjunction with a digital holographic sensor 402, which provides active SWIR imaging, ranging, and WFE estimation. The holographic sensor 402 here is similar to those shown in FIGS. 2 and 3, although some modifications have been made to the placement of components in the holographic sensor 402. Also, the holographic sensor 402 includes lenses 403a-403b and an additional beam combiner 404. The lenses 403a-403b operate to expand inputs (the LO illumination 112 and the Doppler shifted LO illumination 207) from the local oscillators 111, 205, which could denote point sources whose outputs are expanded in order to create larger beams that cover most or all of the detection surfaces of the FPA 109 and Doppler sensor 203. The additional beam combiner 404 combines the portion 106a of the reflected or return illumination 106 with the Doppler-shifted LO illumination 207. Note that the same modifications used in FIG. 4 could be made in FIGS. 2 and 3, or the arrangement shown in FIGS. 2 and 3 could be used in FIG. 4. Also note that any other suitable digital holographic sensor or other wavefront sensor could be used in an auto-alignment system.

The auto-alignment system 202 here supports the use of an off-axis telescope 215 that includes a primary mirror 406 and a secondary mirror 408. The secondary mirror 408 is not located in the optical path between the primary mirror 406 and the output window 216 of the system, which is where the secondary mirror would be located in an on-axis telescope. Each mirror 406 and 408 includes any suitable optical device for reflecting optical signals. In this example, both mirrors 406 and 408 are paraboloid mirrors.

A positioner 410 is coupled to and can move the secondary mirror 408. In some embodiments, the positioner 410 can move the secondary mirror 408 in up to three ways. For example, the positioner 410 could move the secondary mirror 408 in the "x" direction (perpendicular to the plane of FIG. 4), the "y" direction (up and down in FIG. 4). The positioner 410 could also rotate the secondary mirror 408 around one or more of the three axes (xyz), although this is typically done in the plane of FIG. 4. These movements can be done to help change the focus of the optical system and to reduce aberrations. Note that all three directions of movement need not be supported and that a subset of these movements could also be supported. The positioner 410 includes any suitable structure(s) for moving a mirror, such as a hexapod six-axis positioner.

Various mirrors 412-422 are used to direct optical signals to and from the primary and secondary mirrors 406 and 408 and through gimbal axes. Each mirror 412-422 includes any suitable optical device for reflecting optical signals, such as plane mirrors. In some embodiments, one or more of these mirrors (such as the mirrors 414 and 422) could denote fast steering mirrors (FSMs), which can be rotated to support LOS adjustment and correction of pupil wander. In this example, the mirrors 406 and 408, 412-416 and the positioner 410 are located within a dashed box 424 and can be collectively moved to adjust the elevation of the optical system with respect to a target object 101. Similarly, the mirrors 406 and 408, 412-422 and the positioner 410 are located within a dashed box 426 and can be collectively moved to adjust the azimuth of the optical system with respect to a target object 101. Gimbals 428 can be used to adjust these components to alter the elevation and azimuth of the laser system. Each gimbal 428 can denote any suitable structure for moving components in one axis.

Other components in the auto-alignment system 202 include a mirror or beam splitter 430, an aperture sharing element (ASE) 432, and a transmit-receive mirror 434. The mirror or beam splitter 430 reflects optical signals to and from the mirror 422. If a component auto-alignment (AA) subsystem 436 is included in the system, element 430 can be implemented as a beam splitter in order to provide a portion of various signals to the component AA measurement subsystem 436. As explained below, the component AA measurement subsystem 436 helps to provide alignment between an HEL laser, an SWIR laser, and the receiver line-of-sight. The ASE 432 allows an aperture to be shared by multiple transmitted and received optical signals or by both low-power and high-power optical signals. The mirror 434 implements a transmit/receive combiner and passes the transmit beam (frequently via a hole in the mirror) and reflects signals to and from the digital holographic sensor 402. The mirror 434 could denote any suitable optical device for reflecting optical signals, such as a plane mirror.

Imaging optics 438 (such as one or more lenses) are optically positioned between the mirror 434 and a beam splitter 440. The imaging optics 438 alter incoming and outgoing optical signals, including the reflected or return illumination 106 and the auto-alignment illumination 218, which is generated by a gimbal AA subsystem 444. In particular, the beam splitter 440 directs the reflected or return illumination 106 towards the digital holographic sensor 402 and directs the auto-alignment illumination 218 between the gimbal AA subsystem 444 and the imaging optics 438.

An additional mirror 446 reflects the coherent flood illumination 105 from a diverger 448 into the optical path to the window 216. The diverger 448 receives input from the optical power amplifier 201 (which in this example is an SWIR source) and causes the input to diverge into suitable flood illumination 105. The diverger 448 includes any suitable structure for diverging or diffusing optical signals. An optional pupil relay 450 could be included between the mirror 434 and the ASE 432 to improve pupil imaging in the system. The pupil relay 450 forms a real image of the system pupil. Note that the pupil relay 450 could be used in other locations, such as between the mirror 434 and the digital holographic sensor 402. While that position may not allow the mirror 434 to reside at a pupil plane, this may be acceptable since SWIR illumination is used primarily on-axis.

The architecture in FIG. 4 employs the digital holographic sensor 402 and provides a comprehensive layout that supports active focus and LOS control, co-boresighted SWIR imaging, ranging, and adaptive optics compensation for atmospheric turbulence, aero-optics effects, and other disturbances 452. The coherent flood illumination 105 here is directed through the window 216 towards a target object 101 using various lenses and other optical devices shared between the larger system and the auto-alignment system 202. The HEL illumination 303 can also be directed through the window 216 towards a target object 101 using the various lenses and other optical devices shared with the auto-alignment system 202. The reflected or return illumination 106 is received through the window 216 and directed to the digital holographic sensor 402 using the various lenses and other optical devices shared with the auto-alignment system 202.

As described below, the digital holographic sensor 402 can be used to measure external WFEs and other errors caused by the external disturbances 452, as well as WFEs caused by optical aberrations between the digital holographic sensor 402 and the window 216. These WFEs can then be corrected by altering the optical properties of elements between the digital holographic sensor 402 and the window 216, such as by changing the surface properties of one or more deformable mirrors. The gimbal AA subsystem 444 can be used to measure internal errors created within the auto-alignment system 202 or within the larger system, such as line-of-sight errors. The auto-alignment illumination 218 from the gimbal AA subsystem 444 is directed to the mirror 217, which is in front of the primary mirror 406 and reflects the auto-alignment illumination 218 back to the gimbal AA subsystem 444. The mirror 217 is located outside the optical path of the coherent flood illumination 105, the reflected or return illumination 106, and the HEL illumination 303. The auto-alignment illumination 218 is used to provide an indication of internal light-of-sight errors or other errors within the system. These errors can then be corrected by modifying the optical properties of one or more elements along the beam path, such as by controlling the tilt of one or more steering mirrors.

The function of the telescope 215 of FIGS. 2 and 3 can be assigned to the optically-coupled primary mirror 406 and secondary mirror 408 in FIG. 4, where the secondary mirror 408 is moved with the positioner 410 to focus the outgoing HEL illumination 303. Initially, the secondary mirror 408 could be moved along a predetermined path to a position that is based on an estimated range to a target object 101. If present, the component AA measurement subsystem 436 measures auto-alignment beams (not shown) from the HEL, SWIR laser, and receiver on a common detector. This measurement can then be used to adjust one or more alignment mirrors (not shown) to force the HEL, SWIR laser and SWIR sensor to be co-aligned. The HEL 302 and the digital holographic sensor 402 have a common optical path starting after the ASE 432, and the shared optical path can be all reflective (achromatic) except for the ASE 432 and the window 216. The gimbal AA subsystem 444 measures beams sent along the optical path from the digital holographic sensor 402 through the main telescope 215 and thus facilitates the correction of internal errors within the system. The digital holographic sensor 402 functions as both an SWIR imager and a wavefront sensor, which facilitates correction for atmospheric and aero-optical effects on the HEL illumination 303.

One or more of the mirrors shared between the larger system and the auto-alignment system 202 can denote a deformable mirror. For example, in some embodiments, the primary mirror 406 could represent a deformable mirror. As a particular example, actuators in the primary mirror 406 could be used to alter the conic constant of the primary mirror 406 as the distance to the target object 101 varies. The actuators could be controlled by the computer or processing device 110 or by another controller. The secondary mirror 408 can be moved axially when the distance to the target object 101 varies for focus, and the secondary mirror 408 can decenter or tilt to compensate the line of sight. Adjusting the conic constant of the primary mirror 406 can correct substantially all aberrations induced by moving the secondary mirror 408, which frees the dynamic range of the deformable mirror to be used for correction of atmospheric and aero-optical effects. Such an approach can be used to achieve extremely small wavefront errors, such as wavefront errors of about 0.002 to about 0.0005 waves RMS.

In other embodiments, one or more deformable mirrors may be located at any suitable location(s) within the dashed boxes 424-426 of FIG. 4. One example position where a deformable mirror can be located is at a pupil, which in FIG. 4 is at the primary mirror 406 or in the fold near the secondary mirror 408. As such, the mirror 412 could denote a deformable mirror, and the primary and secondary mirrors 406 and 408 could denote simple paraboloid mirrors. The secondary mirror 408 can be moved in the "z" direction for focus and can be offset in the "y" direction (without tilt) to adjust the line of sight and to reduce aberrations. The deformable mirror 412 could be used to correct residual wavefront errors. Such an approach can be used to achieve small wavefront errors, such as wavefront errors of about 0.001 to about 0.009 waves RMS. It is also possible to use multiple deformable mirrors, such as one to correct for internal wavefront errors caused by components of the laser system and another to correct for external wavefront errors caused by the disturbances 452.

Figure 5:
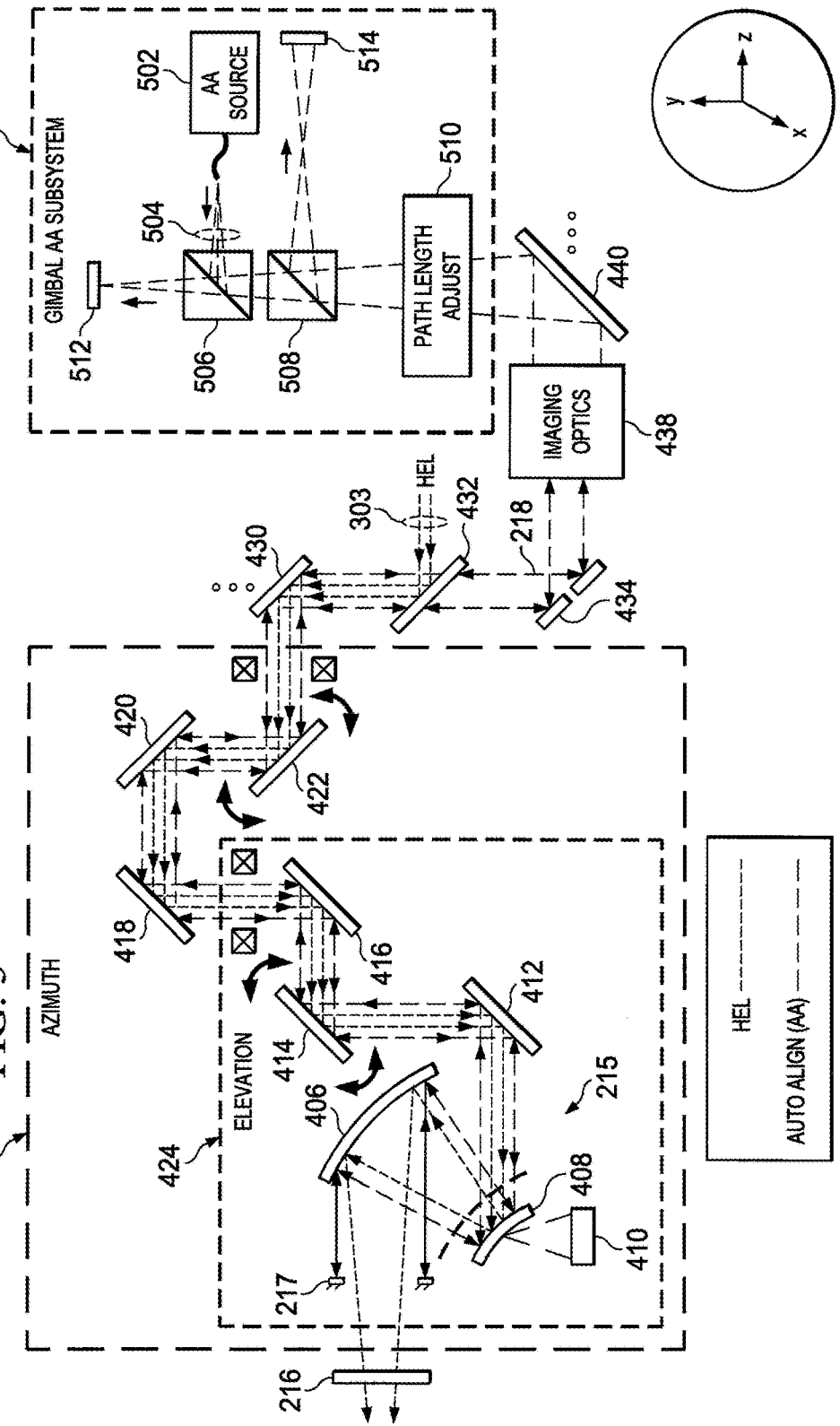

FIG. 5 illustrates an example implementation of the gimbal AA subsystem 444, which is used to support LOS adjustments of the laser system. As shown in FIG. 5, the gimbal AA subsystem 444 includes an auto-alignment illumination source 502, which denotes a suitable source of optical signals used for auto-alignment purposes, such as a point source. Illumination 504 from the illumination source 502 (which can form the auto-alignment illumination 218 of FIG. 4) is provided through two beam combiners 506 and 508 to a path length adjuster 510. The illumination 504 passes through the path length adjuster 510 and then through the optical path of the laser system to the mirror 217. The mirror 217 reflects the illumination 504 back to the path length adjuster 510, and the illumination 504 passes through the beam combiners 506 and 508 again.

The beam combiners 506 and 508 provide different portions of both the outgoing and incoming illumination 504 onto two position sensitive detectors (PSDs) 512 and 514. The PSD 512 effectively receives an image of the illumination 504 from the source 502 and as reflected from the mirror 217, and the PSD 514 effectively receives an image of the laser system's pupil. The path length adjuster 510 operates here to adjust the optical path length traversed by the illumination 504 so that the image of the source 502 and its conjugate (the image after traversing the optical path to and from the mirror 217) is located on the front focal plane of the PSD 512. The fast steering mirrors 414 and 422 could be controlled so that images are substantially centered on the PSDs 512 and 514.

Figure 6:
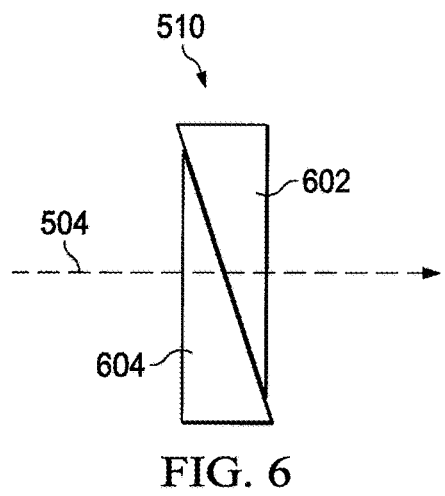

The path length adjuster 510 in FIG. 5 denotes a component that alters the length of an optical path traversed by optical signals and could be implemented in any suitable manner. Ideally, the path length adjuster 510 does not introduce substantial angular or spatial offset in the optical signals. FIG. 6 illustrates one example implementation in which the path length adjuster 510 can be formed using two prisms 602 and 604. The prisms 602 and 604 are substantially optically transparent to the illumination 504 passing through the path length adjuster 510. The prisms 602 and 604 are substantially matched so that they effectively implement a plate having a variable thickness. As one prism slides relative to the other prism, the plate thickness varies, which introduces a change in the optical path length. The spacing between the prisms 602 and 604 may not vary substantially as one or more of the prisms 602 and 604 move. Each prism 602 and 604 could be formed from any suitable material(s), such as glass.

Figure 7:
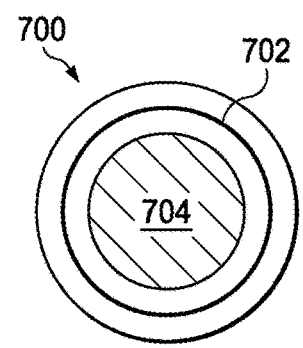

In the approach shown in FIG. 5, the AA illumination 504 could be processed to form an annular beam or could overlap with (but be wider than) the coherent flood illumination 105, reflected or return illumination 106, and HEL illumination 303. In either case, the AA illumination 504 reflected off the mirror 217 is spatially separated from the coherent flood illumination 105, reflected or return illumination 106, and HEL illumination 303. An example of this spatial offset is shown in FIG. 7, where a pupil 700 is defined as having two footprints 702 and 704. The footprint 702 denotes the area in which the AA illumination 504 is reflected from the mirror 217 and returns to the gimbal AA subsystem 444. The footprint 704 denotes the area in which the coherent flood illumination 105, reflected or return illumination 106, and HEL illumination 303 pass.

The separation of the footprints 702 and 704 allows two independent optical corrections to occur within the auto-alignment system 202. First, compensation can occur for internal sensor effects, such as focus errors and induced aberrations created within the telescope 215 itself. The telescope 215 can be focused nominally to a target range by moving the secondary mirror 408 to a predicted position associated with that range. WFE of the telescope 215 can be compensated for the given telescope configuration using one or more deformable mirrors as described above. Second, compensation can occur for external effects (such as atmospheric and aero-optics) using wavefront measurements made by the digital holographic sensor 402. The coherent flood illumination 105, reflected or return illumination 106, and HEL illumination 303 can require both corrections, but the AA illumination 504 does not require correction for external disturbances since the AA illumination 504 does not experience those external disturbances. As a result, the illumination 504 reflected from the mirror 217 can be spatially separated so that corrections for external disturbances do not affect the illumination 504.

Figure 8:
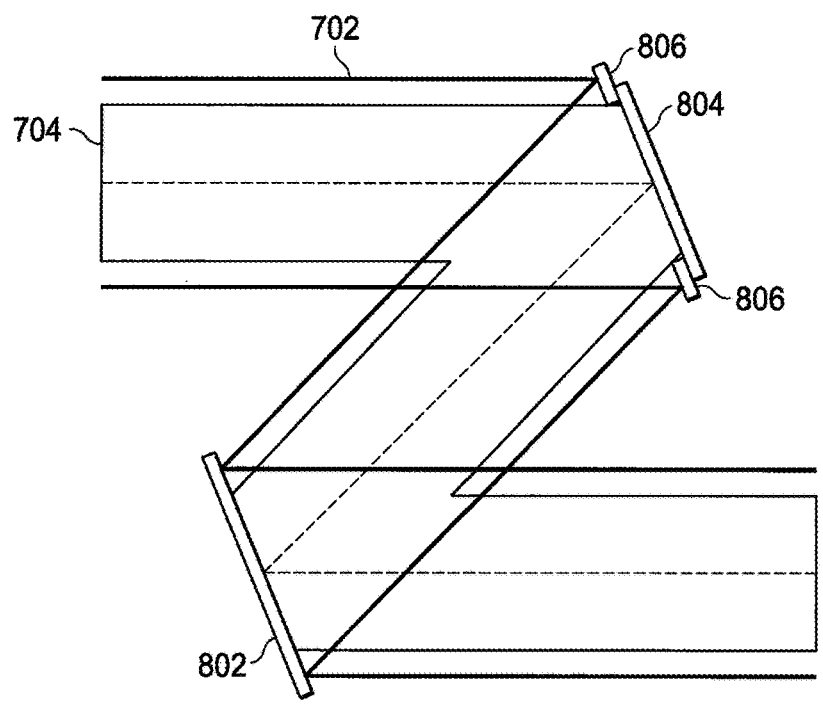

As noted above, it is possible to use one or multiple deformable mirrors in order to support optical corrections in the auto-alignment system 202. As noted above, a single mirror (such as the primary mirror 406 or the mirror 412) could denote a deformable mirror. FIG. 8 illustrates an example in which multiple deformable mirrors 802 and 804 could be used. The deformable mirrors 802 and 804 could denote any pair of mirrors shared between the larger system and the auto-alignment system 202, and those mirrors need not be adjacent to one another in the optical path. In this example, the deformable mirror 802 can be used to provide internal WFE correction, while the deformable mirror 804 can be used to provide external WFE correction. The illumination 504 in the footprint 702 does not require external WFE correction, so an annular mask 806 can be used with the deformable mirror 804. The annular mask 806 redirects illumination within the footprint 702 without modification of that illumination by the deformable mirror 804, while at the same time allowing illumination in the footprint 704 to be modified by the deformable mirror 804. This helps to maintain the spatial separation between the footprints 702 and 704 near the pupil image to keep the illumination 504 from being influenced by the external WFE corrections.

Figure 9:
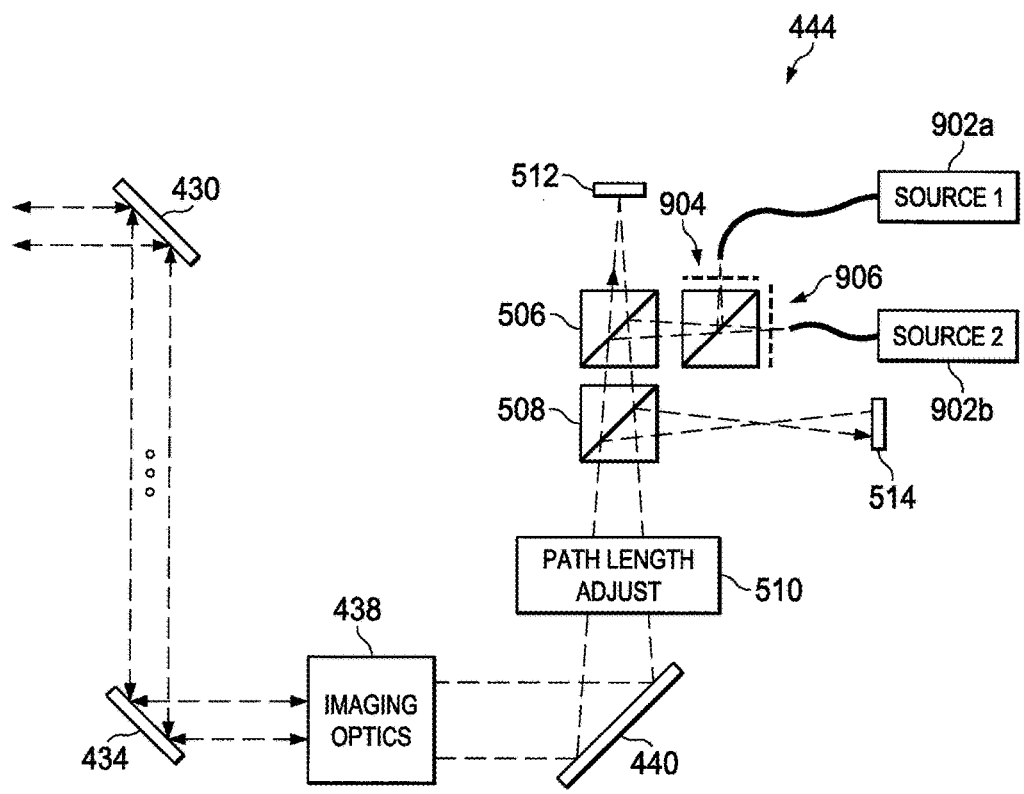
Figure 10:
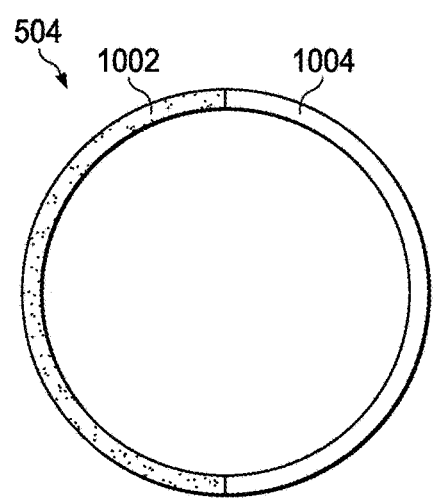

Also as noted above with respect to FIG. 5, the PSDs 512 and 514 operate to detect positions or angles of arrival of the incoming illumination 504. The PSD 512 ideally obtains an image of the point source (source 502), while the PSD 514 ideally obtains an image of a pupil (defined by the mirror 217). The PSDs 512 and 514 can be high-frame-rate imaging sensors. Lateral effect devices could also be used to implement the PSDs 512 and 514, with suitable coding and decoding schemes. FIG. 9 illustrates one example coding and decoding scheme in which the gimbal AA subsystem 444 includes two sources 902a and 902b of the illumination 504. The sources 902a and 902b both provide illumination to a beam combiner 904, which combines the illumination from both sources to generate the illumination 504. Masks 906 on the beam combiner 904 can be used to shape the illumination from the sources 902a and 902b into a suitable format for the illumination 504. FIG. 10 illustrates an example formatting of the illumination 504, where different halves or other portions 1002 and 1004 of the illumination 504 are formed using illumination from different sources 902a and 902b.

The illumination from each source 902a and 902b can be temporally modulated or otherwise altered so that the centroid of the illumination from each source 902a and 902b can be determined. This allows, for example, the system to measure the centroids of the individual illuminations using the PSD 512. The PSD 514 can also be used to measure the offset of the centroid in the pupil image, which is formed by the illumination from both sources 902a and 902b. The fast steering mirrors 414 and 422 could be adjusted to move the centroid of the combined image as needed, while focusing of the illumination 504 can be adjusted to move the centroids of the individual illuminations from the sources 902a and 902b as needed.

Although FIGS. 4 through 10 illustrate one example of an auto-alignment system 202 for a coherent imaging system or other system and related details, various changes may be made to FIGS. 4 through 10. For example, optical paths and their associated optical devices could vary widely while still supporting the same or similar functionality described above. In general, any suitable optical devices can be placed in any suitable optical paths to support the auto-alignment, focusing, and error correcting functionality of the larger system or the auto-alignment system 202. Also, the computer or processing device 110 could provide all of the control functionality used to adjust various devices within the larger system or the auto-alignment system 202, or separate controllers can be provided for adjusting different devices or different groups of devices within the larger system or the auto-alignment system 202.

Figure 11:
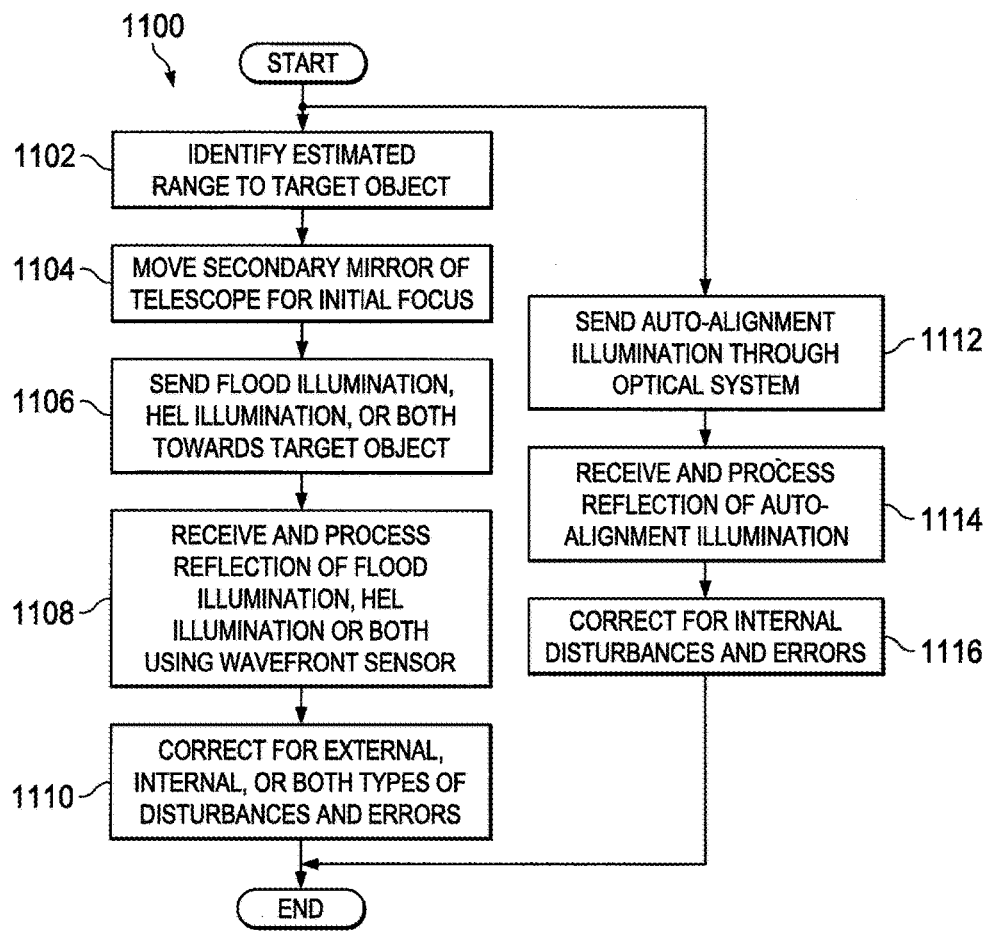
FIG. 11 illustrates an example method for beam direction employing wavefront sensing in high-power laser systems and other systems in accordance with this disclosure.

FIG. 11 illustrates an example method 1100 for beam direction employing wavefront sensing in high-power laser systems and other systems in accordance with this disclosure. For ease of explanation, the method 1100 is described with respect to the auto-alignment system 202 of FIGS. 4 and 5 operating in the coherent imaging systems of FIGS. 1 through 3. However, the method 1100 could be used in any other suitable manner.

As shown in FIG. 11, an estimated range to a target object is identified at step 1102, and a secondary mirror of a telescope is moved to a position based on the estimated range at step 1104. This could include, for example, a separate or combined subsystem using a RADAR, LADAR, or other ranging sensor 113 to estimate the range to a target object 101. This could also include using the Doppler sensor 203 in a pulsed laser system to measure the target range. Any other suitable technique could be used to identify an estimated range to a target. This could further include using the positioner 410 to move the secondary mirror 408 to a specified position associated with the estimated range. In some embodiments, a lookup table or other data structure could associate estimated ranges with positions for the secondary mirror 408.

Coherent flood illumination, HEL illumination, or both are transmitted through the optical system (including the telescope) at step 1106, and reflected coherent flood illumination, HEL illumination, or both are received and processed using a digital holographic sensor or other wavefront sensor at step 1108. This could include, for example, the optical power amplifier 201 generating the coherent flood illumination 105 or the HEL 302 generating the HEL illumination 303. This could also include directing superimposed LO illumination 112 and reflected or return illumination 106 onto the Doppler sensor 203 and directing superimposed Doppler-shifted LO illumination 207 and reflected or return illumination 106 (and optionally HEL LO-modulated illumination 306 and HEL beam return 305) onto the FPA 109. In addition, this could include the computer or processing device 110 or other controller analyzing the outputs from the Doppler sensor 203 and the FPA 109. If necessary, external disturbances and errors are corrected at step 1110. This could include, for example, the computer or processing device 110 or other controller using WFE measurements from the digital holographic sensor 402 or other wavefront sensor to perform phase correction on the coherent flood illumination 105, the reflected or return illumination 106, or the HEL illumination 303 using at least one deformable mirror. This ideally corrects for any WFE or other external errors.

Auto-alignment illumination is transmitted through the optical system (including the telescope) at step 1112, and reflected auto-alignment illumination is received and processed at step 1114. This could include, for example, the illumination source 502 generating the illumination 504. This could also include multiple sources 902a and 902b generating illumination that is combined to produce the illumination 504. This could further include transporting the illumination 504 through the optical system (as the auto-alignment illumination 218) and reflecting at least some of the illumination 504 from the mirror 217, where at least the reflected portion of the illumination 504 is spatially separate from coherent flood illumination 105, reflected or return illumination 106, and HEL illumination 303. In addition, this could include the computer or processing device 110 or other controller analyzing the outputs from the PSDs 512 and 514 to identify whether spot and pupil images are centered. If necessary, internal disturbances and errors are corrected at step 1116. This could include, for example, the computer or processing device 110 or other controller adjusting the fast steering mirrors 412 and 422, the positioner 410 for the secondary mirror 408, or other optical devices so that the spot and pupil images are substantially centered. This ideally corrects for any focus, line-of-sight, or other internal errors.

There might be instances when the line between internal and external errors is blurred since the two are coupled and both types of errors will likely be registered in the digital holographic sensor 402. For example, changing focus can lead to a line-of-sight change. Having the focus/line-of-sight adjustment and the wavefront correction optically coupled in the disclosed manner allows auto-alignment and focusing to occur alongside internal and external wavefront error correction. This is achieved by combining the use of a digital holographic sensor 402 and an auto-alignment system 202 (and the focus mechanism 310 if applicable). The auto-alignment system 202 corrects for internal errors within the laser system, while outputs from the digital holographic sensor 402 can be used to correct for internal and external wavefront errors.

Although FIG. 11 illustrates one example of a method 1100 for beam direction employing wavefront sensing in high-power laser systems and other systems, various changes may be made to FIG. 11. For example, various steps in FIG. 11 could overlap, occur in parallel, occur in a different order, or occur any number of times. As a particular example, steps 1112-1116 could occur in parallel with only steps 1106-1110, or steps 1112-1116 could occur serially prior to 1106-1110. The parallel performance of steps 1112-1116 is allowed in part due to the spatial separation of the auto-alignment illumination from the coherent flood illumination/returned or reflected illumination/HEL illumination. As another particular example, steps 1102 and 1104 could occur repeatedly as the distance to a target object changes.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
a wavefront sensor configured to receive coherent flood illumination that is reflected from a remote object and to estimate wavefront errors associated with the coherent flood illumination; and
a beam director optically coupled to the wavefront sensor and comprising a telescope and an auto-alignment system, the auto-alignment system configured to adjust at least one first optical device in order to alter a line-of-sight of the wavefront sensor;
wherein the wavefront errors estimated by the wavefront sensor include a wavefront error resulting from the adjustment of the at least one first optical device; and
wherein the auto-alignment system is further configured to generate auto-alignment illumination that is reflected off a mirror and that returns to the auto-alignment system so that the auto-alignment system is able to correct for internal line-of-sight errors within a system, the mirror outside an optical path of the coherent flood illumination.

2. The apparatus of claim 1, wherein the beam director further comprises at least one second optical device configured to correct for the wavefront errors.

3. The apparatus of claim 2, wherein the at least one second optical device comprises at least one deformable mirror.

4. The apparatus of claim 3, wherein the at least one deformable mirror comprises a primary mirror of the telescope.

5. The apparatus of claim 3, wherein:
the at least one second optical device comprises first and second deformable mirrors;
the auto-alignment system is configured to adjust the first deformable mirror to correct for a first portion of the wavefront errors; and
the auto-alignment system is configured to independently adjust the second deformable mirror to correct for a second portion of the wavefront errors.

6. The apparatus of claim 1, wherein the wavefront sensor is further configured to receive a high-energy laser (HEL) beam reflected from the remote object.

7. The apparatus of claim 1, wherein the telescope comprises an off-axis telescope.

8. An apparatus comprising:
a wavefront sensor configured to receive coherent flood illumination that is reflected from a remote object and to estimate wavefront errors associated with the coherent flood illumination; and
a beam director optically coupled to the wavefront sensor and comprising a telescope and an auto-alignment system, the auto-alignment system configured to adjust at least one optical device in order to alter a line-of-sight of the wavefront sensor;
wherein the wavefront errors estimated by the wavefront sensor include a wavefront error resulting from the adjustment of the at least one optical device; and
wherein the auto-alignment system comprises:
at least one illumination source configured to generate auto-alignment illumination;
a plurality of optical elements configured to direct the auto-alignment illumination and the coherent flood illumination towards the telescope along a common optical path through the beam director, wherein the optical elements comprise at least one fast steering mirror;
a mirror optically positioned after the telescope and configured to reflect at least some of the auto-alignment illumination back towards the telescope and along the common optical path through the beam director;
at least one detector configured to receive the reflected auto-alignment illumination and to detect a position or an angle-of-arrival of the reflected auto-alignment illumination; and
a controller configured to adjust the at least one fast steering mirror based on the detected position or angle-of-arrival in order to adjust at least part of the common optical path and to adjust the line-of-sight of the wavefront sensor.

9. The apparatus of claim 8, wherein the mirror optically positioned after the telescope comprises an annular mirror.

10. The apparatus of claim 9, wherein the annular mirror is configured such that the reflected auto-alignment illumination is spatially separated from coherent flood illumination transmitted towards the remote object and the coherent flood illumination reflected from the remote object.

11. The apparatus of claim 9, wherein:
the auto-alignment system further comprises a path length adjuster configured to adjust an optical path length of the auto-alignment illumination; and
the at least one detector is further configured to capture images of an illumination pattern caused by the at least one illumination source on the annular mirror.

12. A system comprising:
at least one illumination source configured to generate coherent flood illumination;
a wavefront sensor configured to receive the coherent flood illumination that is reflected from a remote object and to estimate wavefront errors associated with the coherent flood illumination; and
a beam director optically coupled to the wavefront sensor and comprising a telescope and an auto-alignment system, the auto-alignment system configured to adjust at least one first optical device in order to alter a line-of-sight of the wavefront sensor;
wherein the wavefront errors estimated by the wavefront sensor include a wavefront error resulting from the adjustment of the at least one first optical device; and
wherein the auto-alignment system is further configured to generate auto-alignment illumination that is reflected off a mirror and that returns to the auto-alignment system so that the auto-alignment system is able to correct for internal line-of-sight errors within the system, the mirror outside an optical path of the coherent flood illumination.

13. The system of claim 12, wherein:
the system further comprises a high-energy laser (HEL) source configured to generate HEL illumination;
the telescope comprises a focusing mechanism; and
the wavefront errors estimated by the wavefront sensor include a wavefront error resulting from the focus mechanism.

14. The system of claim 12, wherein the beam director further comprises at least one second optical device configured to correct for the wavefront errors.

15. The system of claim 14, wherein the at least one second optical device comprises at least one deformable mirror.

16. The system of claim 15, wherein the at least one deformable mirror comprises a primary mirror of the telescope.

17. The system of claim 15, wherein:
the at least one second optical device comprises first and second deformable mirrors;
the first deformable mirror is configured to compensate for a first portion of the wavefront errors; and
the second deformable mirror is configured to compensate for a second portion of the wavefront errors.

18. A system comprising:
at least one first illumination source configured to generate coherent flood illumination;
a wavefront sensor configured to receive the coherent flood illumination that is reflected from a remote object and to estimate wavefront errors associated with the coherent flood illumination; and
a beam director optically coupled to the wavefront sensor and comprising a telescope and an auto-alignment system, the auto-alignment system configured to adjust at least one optical device in order to alter a line-of-sight of the wavefront sensor;
wherein the wavefront errors estimated by the wavefront sensor include a wavefront error resulting from the adjustment of the at least one optical device; and
wherein the auto-alignment system comprises:
at least one second illumination source configured to generate auto-alignment illumination;
a plurality of optical elements configured to direct the auto-alignment illumination and the coherent flood illumination towards the telescope along a common optical path through the beam director, wherein the optical elements comprise at least one fast steering mirror;
a mirror optically positioned after the telescope and configured to reflect at least some of the auto-alignment illumination back towards the telescope and along the common optical path through the beam director;
at least one detector configured to receive the reflected auto-alignment illumination and to detect a position or an angle-of-arrival of the reflected auto-alignment illumination; and
a controller configured to adjust the at least one fast steering mirror based on the detected position or angle-of-arrival in order to adjust at least part of the common optical path and to adjust the line-of-sight of the wavefront sensor.

19. The system of claim 18, wherein the mirror optically positioned after the telescope comprises an annular mirror.

20. The system of claim 19, wherein the annular mirror is configured such that the reflected auto-alignment illumination is spatially separated from coherent flood illumination transmitted towards the remote object and the coherent flood illumination reflected from the remote object.

21. The system of claim 19, wherein:
the auto-alignment system further comprises a path length adjuster configured to adjust an optical path length of the auto-alignment illumination; and
the at least one detector is further configured to capture images of an illumination pattern caused by the at least one second illumination source on the annular mirror.

22. A system comprising:
at least one illumination source configured to generate coherent flood illumination;
a wavefront sensor configured to receive the coherent flood illumination that is reflected from a remote object and to estimate wavefront errors associated with the coherent flood illumination; and
a beam director optically coupled to the wavefront sensor and comprising a telescope and an auto-alignment system, the auto-alignment system configured to adjust at least one optical device in order to alter a line-of-sight of the wavefront sensor;
wherein the wavefront errors estimated by the wavefront sensor include a wavefront error resulting from the adjustment of the at least one optical device;
wherein the telescope comprises a primary mirror, a secondary mirror, and a positioner configured to move the secondary mirror; and
wherein the system further comprises:

a range sensor configured to estimate a distance to the remote object; and a controller configured to cause the positioner to move the secondary mirror to an initial location based on the estimated distance.

23. A method comprising:

receiving coherent flood illumination that is reflected from a remote object at a wavefront sensor;

estimating wavefront errors associated with the coherent flood illumination using the wavefront sensor; and adjusting a line-of-sight of the wavefront sensor using a beam director comprising a telescope and an auto-alignment system, the auto-alignment system adjusting at least one first optical device in order to alter the line-of-sight of the wavefront sensor;

wherein the wavefront errors estimated by the wavefront sensor include a wavefront error resulting from the adjustment of the at least one first optical device; and wherein the auto-alignment system generates auto-alignment illumination that is reflected off a mirror and that returns to the auto-alignment system so that the auto-alignment system is able to correct for internal line-of-sight errors within a system, the mirror outside an optical path of the coherent flood illumination.

24. The method of claim 23, further comprising:

estimating the wavefront error resulting from the adjustment of the line-of-sight of the wavefront sensor.

25. The method of claim 23, wherein the wavefront errors also include a wavefront error caused by disturbances along a path of the coherent flood illumination.

26. The method of claim 25, further comprising:

directing high-energy laser (HEL) illumination towards the remote object;

calculating a wavefront error of the HEL illumination based on the estimated wavefront error associated with the coherent flood illumination; and adjusting the HEL illumination based on the calculated wavefront error of the HEL illumination.

27. The method of claim 26, wherein adjusting the HEL illumination comprises adjusting at least one deformable mirror of the beam director.

28. A method comprising:

receiving coherent flood illumination that is reflected from a remote object at a wavefront sensor;

estimating wavefront errors associated with the coherent flood illumination using the wavefront sensor; and adjusting a line-of-sight of the wavefront sensor using a beam director comprising a telescope and an auto-alignment system, the auto-alignment system adjusting at least one optical device in order to alter the line-of-sight of the wavefront sensor;

wherein the wavefront errors estimated by the wavefront sensor include a wavefront error resulting from the adjustment of the at least one optical device and a wavefront error caused by disturbances along a path of the coherent flood illumination; and wherein the method further comprises:

focusing high-energy laser (HEL) illumination on the remote object by moving a secondary mirror of the telescope;

measuring a wavefront error resulting from movement of the secondary mirror using the wavefront sensor; and correcting the wavefront error resulting from movement of the secondary mirror using a deformable mirror.

* * * * *